HYDRAULIC POWER UNIT AND CONTROL SYSTEM FOR TRACTORS

Original Filed Aug. 28, 1958 3 Sheets-Sheet 1

INVENTORS
HENRY EDWARD MERRITT
PIERRE FRANCOIS TIBERGHIEN
ALAIN HENRI EUGENE GOUGELOT
by: Carlson, Pitzner, Hubbard & Wolfe
ATTORNEYS.

HYDRAULIC POWER UNIT AND CONTROL SYSTEM FOR TRACTORS

Original Filed Aug. 28, 1958 3 Sheets-Sheet 2

INVENTORS
HENRY EDWARD MERRITT
PIERRE FRANCOIS TIBERGHIEN
ALAIN HENRI EUGENE GOUGELOT
by: Carlson, Pitzner, Hubbard & Wolfe
ATTORNEYS.

HYDRAULIC POWER UNIT AND CONTROL SYSTEM FOR TRACTORS

Original Filed Aug. 28, 1958 3 Sheets-Sheet 3

INVENTORS
HENRY EDWARD MERRITT
PIERRE FRANCOIS TIBERGHIEN
ALAIN HENRI EUGENE GOUGELOT
by Carlson, Pitzner, Hubbard & Wolfe
ATTORNEYS.

United States Patent Office

Re. 25,415
Reissued July 16, 1963

25,415

HYDRAULIC POWER UNIT AND CONTROL SYSTEM FOR TRACTORS

Henry E. Merritt, Claverdon, Warwick, England, and Pierre Francois Tiberghien, Sevran, Seine-et-Oise, and Alain Henri Eugene Gougelot, Flers-lez-Lille, Nord, France, assignors to Massey-Ferguson (United Kingdom) Limited, a British company Original No. 3,003,568, dated Oct. 10, 1961, Ser. No. 757,768, Aug. 28, 1958. Application for reissue Mar. 16, 1962, Ser. No. 180,950
Claims priority, application Great Britain Sept. 3, 1957
13 Claims. (Cl. 172—9)

Matter enclosed in heavy brackets [ ] appears in the original patent but forms no part of this reissue specification; matter printed in italics indicates the additions made by reissue.

The invention relates generally to tractors of the type equipped with a power elevatable hitch linkage and more particularly, to an improved hydraulically operated power unit and control system for use in such tractors.

One object of the invention is to provide a hydraulic system of the above general character affording what is commonly known as automatic draft control and automatic position control as well as full visual control of auxiliaries in which manual regulation of all three types of control as well as selection between those different types is effected through the medium of a single manual operator or control tower.

Another object is to provide an improved valve assembly for use in tractor hydraulic systems.

Another object is to provide improved means for selecting the type of control under which the system is to operate.

Another object is to provide improved spring arrangement for balancing tension and compressive forces imposed on the tractor by the hitch linkage.

Still another object is to provide improved means for unloading and reloading the pump supplying pressure fluid to the hydraulic system.

A further object is to provide improved means for regulating the movements of the control valve so as to reduce shock loads on the hitch linkage regardless of the type of control in use.

A still further object is to provide improved means for automatically adapting the hydraulic system for efficient operation with implements of different weights.

It is also an object of the invention to provide a tractor hydraulic system which is simple in construction, efficient and dependable in operation and which is particularly characterized by its versatility and wide range of adaptability.

Other objects and advantages of the invention will become apparent from the following detailed description of the preferred embodiment illustrated in the accompanying drawings in which.

While a single preferred embodiment of the invention has been shown and will be described herein, this is not intended to limit the invention to the particular form illustrated. On the contrary, the intention is to cover all modifications, adaptations and alternative constructions falling within the spirit and scope of the invention as more broadly or generally characterized in the appended claims.

GENERAL

Figure 1:
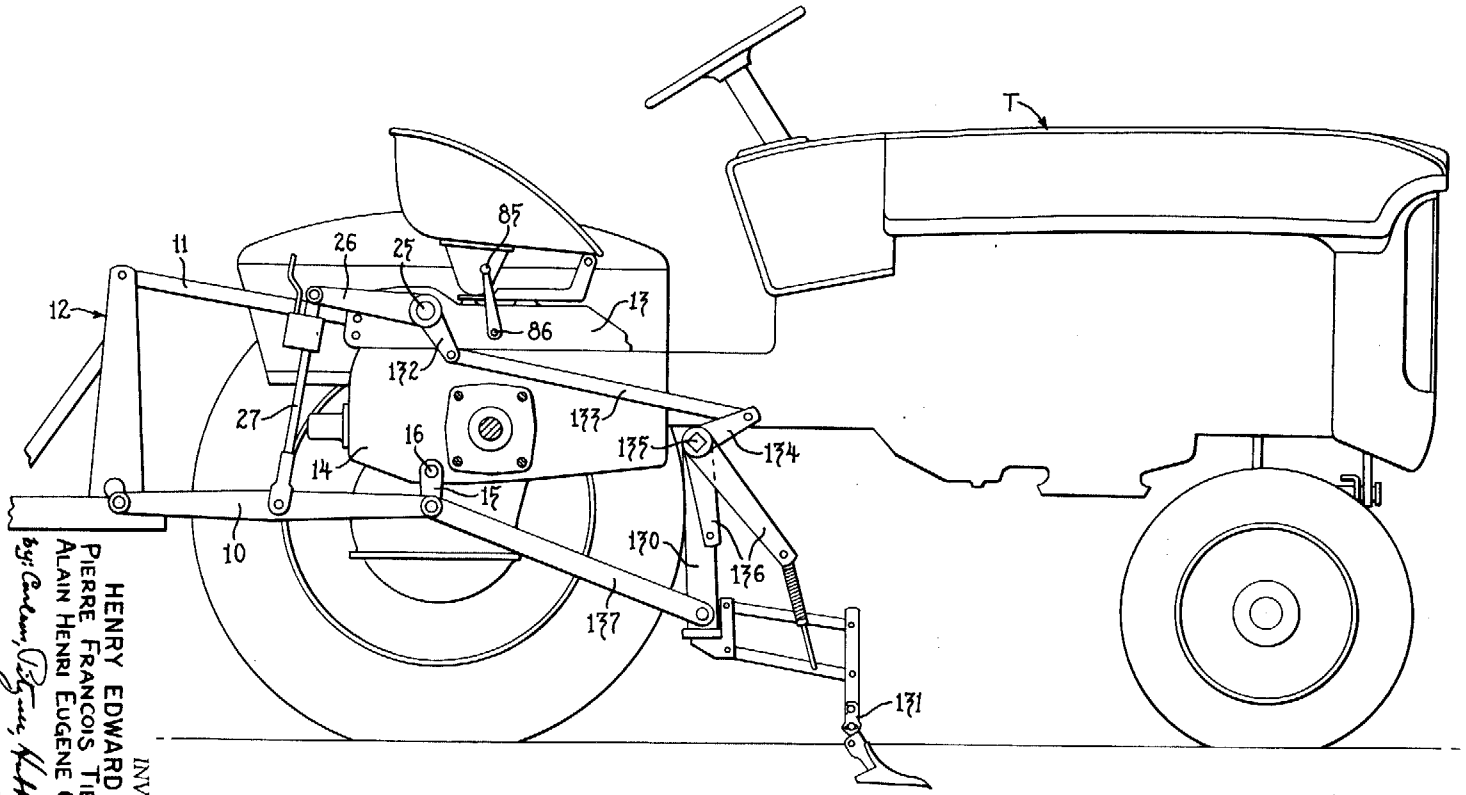
FIGURE 1 is a side elevational view of a tractor equipped with a hydraulic system embodying the features of the invention, the drive wheel on the near side of the tractor being removed to show details of the implement hitch linkage and associated parts.

By way of illustration, the invention has been shown as incorporated in a tractor T having a trailing three element implement hitch linkage including a pair of laterally spaced lower or draft links 10 and a top link 11. The links are pivoted on the tractor to swing vertically for raising or lowering an implement 12 connected in the conventional manner to the trailing ends of the respective links. As shown in FIG. 1, the top link is pivoted at its forward end on the upper part of the tractor body, in this instance, to a cover plate 13 which closes the upper end of the tractor center housing 14. Draft links 10, in this instance, are pivoted to depending arms 15 carried by a transverse rock shaft 16 journalled in the lower portion of the housing. This latter connection is utilized to transmit draft forces for control of the hydraulic system as will appear presently.

POWER UNIT

Figures 2, 3:
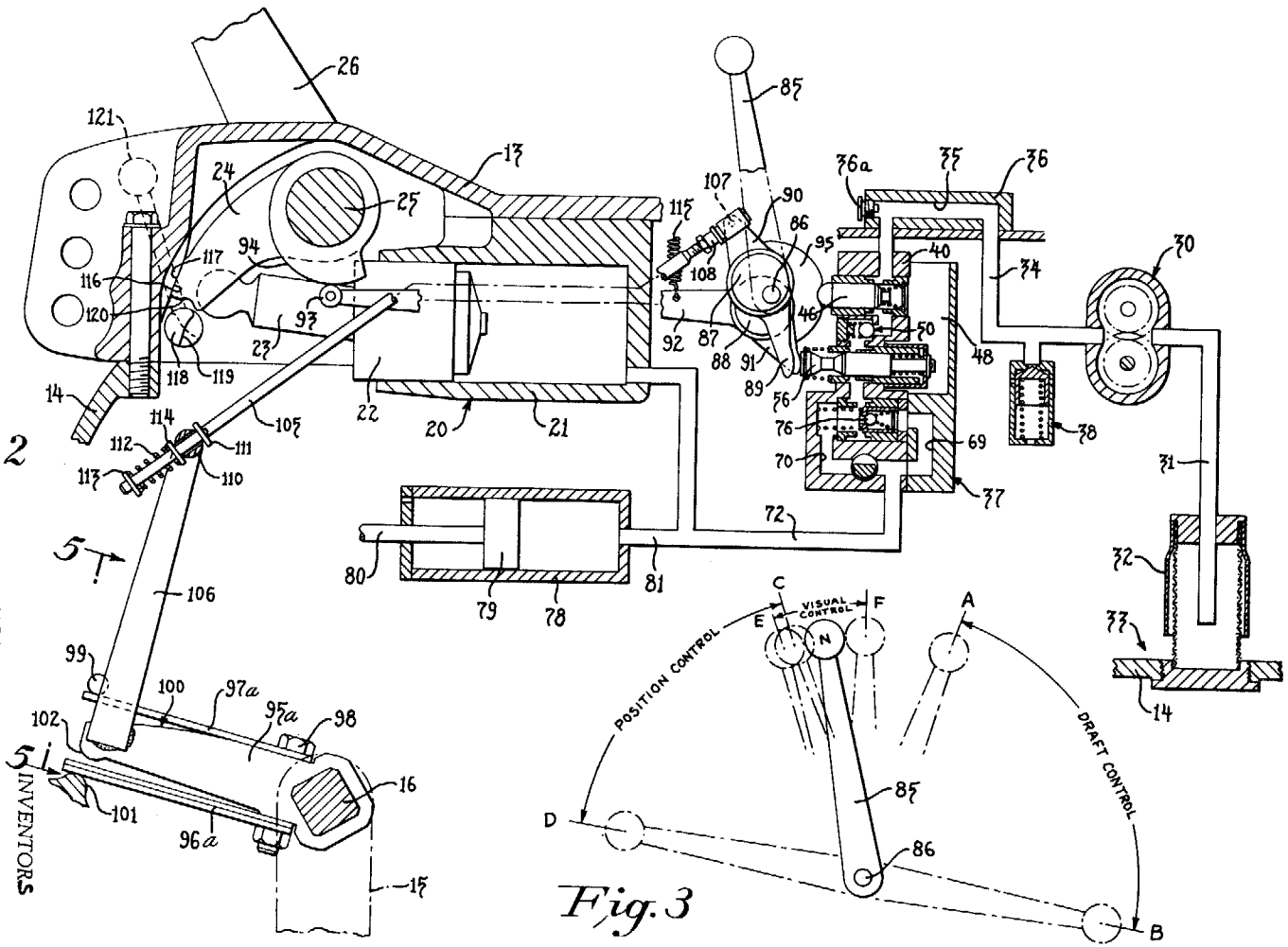
FIG. 2 is a partly diagrammatic sectional view through the center housing of the tractor showing details of the hydraulic system.
FIG. 3 is a diagrammatic view of the manual control lever showing its operating ranges for different types of control.

Raising and lowering of the draft links 10 and attached implement is effected by a power unit 20 enclosed in the center housing 14 of the tractor as shown in FIG. 2. The power unit is preferably hydraulically operated and, in the exemplary embodiment, comprises a cylinder 21 supported on the cover plate 13 with its open end facing rearwardly. A piston 22 slidingly fitted in the cylinder 21 is operatively connected by a piston rod 23 with a crank arm 24 rigidly fixed on a cross shaft 25 journalled in the center housing cover plate 13.

As is customary in tractors of the general type under discussion, the shaft 25 projects at opposite sides of the housing and carries a crank arm 26 (FIG. 1) at each end connected by a drop link 27 with the draft link at the same side of the tractor. The arrangement is such that when pressure fluid is supplied to the cylinder 21 the piston 22 is forced rearwardly to rock the shaft 25 clockwise and thus swing the hitch linkage and the attached implement upwardly. When fluid is permitted to escape from the cylinder, the weight of the hitch linkage and the load which it carries forces the piston inwardly as the linkage descends.

Pressure fluid for operating the power unit 20 is supplied by a pump 30 which may be driven continuously from the tractor engine in well-known manner. The particular pump shown is a gear pump connected to draw fluid such as oil through an inlet conduit 31 and filter 32 from a sump or reservoir 33 provided in the lower portion of the center housing 14.

Pressure fluid discharged by the pump 30 is carried by a conduit 34 and passage 35 in a bridge member 36 to a valve assembly 37. The bridge member 36 provides externally accessible ports for connecting the supply conduit to auxiliary equipment when required, the ports otherwise being closed by plugs 36a. A relief or overload release valve 38 connected to the conduit 34 opens automatically when the pressure in the system exceeds a predetermined value and diverts the fluid from the pump to the sump to prevent overloading of the hydraulic system. This valve also serves to unload the pump 30 when a supply of pressure fluid is not required.

CONTROL VALVE ASSEMBLY

Figure 4:
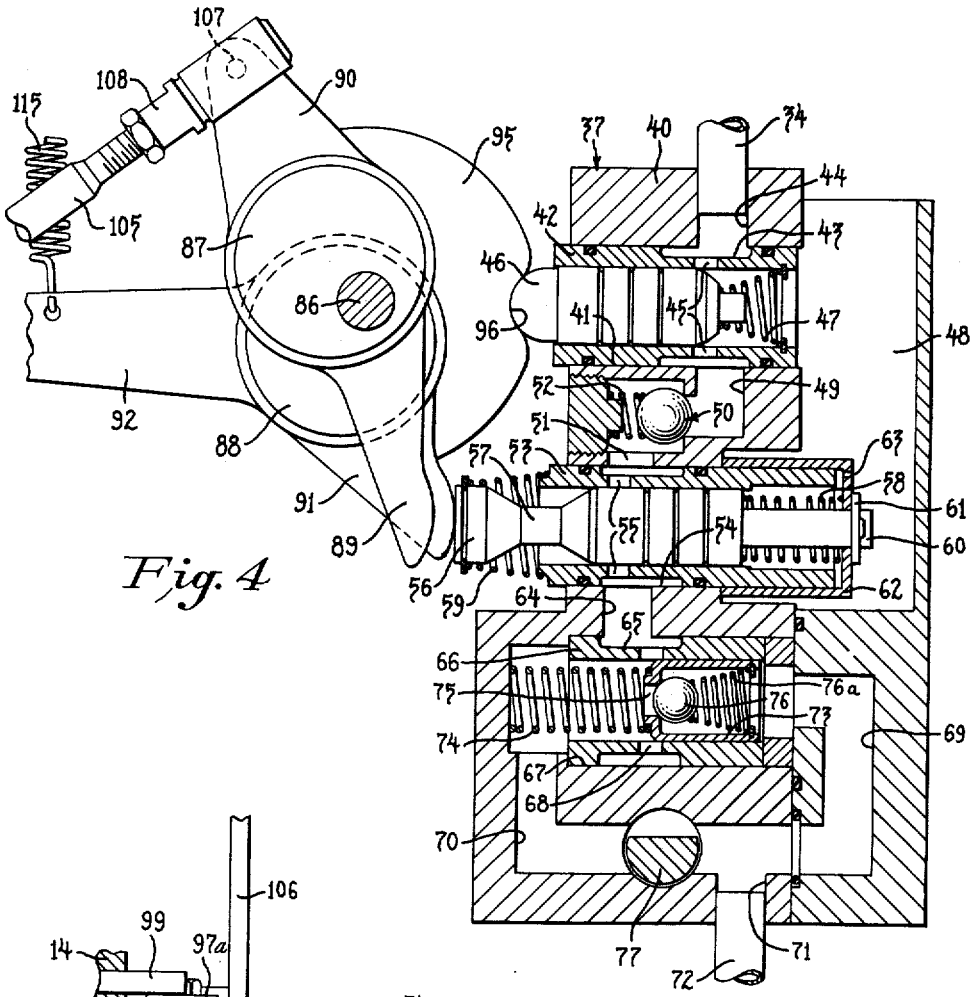
FIG. 4 is a sectional view of the control valve assembly shown in FIG. 2 but on a larger scale.
Figure 5:
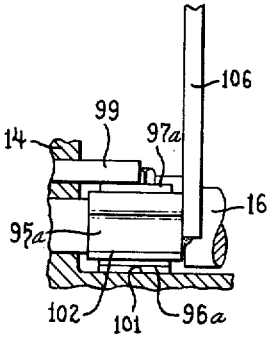
FIG. 5 is a fragmentary sectional view taken on a plane substantially on the line 5—5 of FIG. 2.

The valve assembly 37 includes in a single, compact unit a plurality of valves by which the various functions of the hydraulic system are controlled including the delivery of pressure fluid to and exhaust of fluid from the power unit 20. As shown in FIG. 4, the valve assembly 37 comprises a casing 40 formed with a series of parallel bores and connecting passages for accommodating the various valve elements of the assembly. Thus, adjacent the upper end of the casing a bore 41 accommodates a by-pass valve comprising a sleeve 42 having an external groove defining an annular chamber 43 communicating with a port 44 into which the supply conduit 34 delivers pressure fluid. Radial ports 45 of the sleeve are controlled by an axially slidable plunger 46 yieldably urged by a spring 47 toward the open position in which it is shown in the drawing. When the ports 45 are open, fluid passes from the chamber 43 to the interior of the sleeve 42 from which it is discharged into an auxiliary reservoir 48 formed in the valve casing. Fluid is thus released from the system at low pressure and the pump is unloaded to reduce the power demands on the tractor engine. Excess fluid discharged into the reservoir 48 is spilled over into the sump 33.

The plunger 46 is adapted to be shifted to closed position by manually operable control means described hereinafter. When in the closed position ports 45 are covered by the plunger and exhaust of fluid to the auxiliary reservoir is interrupted. Pressure fluid then flows from the chamber 43 through a passage 49 in the valve casing and through a check valve 50 to a chamber 51 of the main control valve. Check valve 50 as shown is a ball type valve urged by a spring 52 to a position to prevent reverse flow through the passage 49.

The chamber 51 of the main control valve is defined by an external circumferential groove in a sleeve 53 seated in a bore 54 in the valve casing. Radial ports 55 in the sleeve provide communication between the chamber 51 and the interior of the sleeve which is open at one end to the sump 33. Opening and closing of the ports 55 is controlled by a plunger 56 slidable in the sleeve, the plunger having a section 57 of reduced diameter through which the ports 55 may be vented to the sump.

In the preferred form shown, the valve plunger 56 is urged toward a closed position by a pair of springs 58 and 59 interposed between opposite ends of the plunger and the sleeve. Control means to be described hereinafter is provided for shifting the plunger toward open position. Movements of the plunger at either direction are restrained or damped by dashpot means associated with the plunger. For this purpose the end portion 60 of the plunger remote from the open end of the sleeve is reduced in diameter and extended to project beyond the other end of the sleeve.

Mounted on the projecting end of the plunger and retained in place by a stop washer 61 pinned to the plunger is a cup-shaped end cap 62 adapted to telescope over the sleeve. The end cap and sleeve thus define a chamber adapted to expand upon movement of the plunger in one direction and to contract upon movement of the plunger in the opposite direction. As will be seen by reference to the drawings, the end cap is disposed within the auxiliary reservoir 48 so that it is completely submerged in the oil collected in the reservoir. Accordingly, fluid is alternately drawn into and expelled from the chamber through a hole 63 in the end of the cap as the plunger is shifted in one direction or the other. The hole 63 is dimensioned to restrict flow sufficiently to restrain the plunger against too rapid movement in either direction and thus reduce shock loads on the hydraulic system.

With the valve plunger 56 in closed position exhaust of fluid to the sump is interrupted and pressurized fluid in the chamber 51 is directed through a restrictor valve to the hydraulic unit 20. More particularly, the fluid flows from the chamber 51 through a passage 64 in the casing to an annular chamber 65 defined by a sleeve 66 seated in a bore 67 in the casing. Radial ports 68 permit communication between the chamber 65 and the interior of the sleeve which opens at opposite ends to a pair of passages 69 and 70. These passages jointly communicate with a port 71 connected by a conduit 72 with the closed end of the cylinder 21 of the power unit as shown in FIG. 1.

Slidable within the sleeve 66 is a cup-shaped valve member 73 normally held out of blocking relation to the port 68 by a spring 74. The valve member has a central passage 75 in its end wall closed against fluid flow in one direction by a check valve comprising a ball 76 urged toward the passage by a spring 76a. The check valve is adapted to open and permit substantially unrestricted fluid flow to the power unit when the main control valve is set to direct fluid to the power unit for raising the hitch linkage. Upon movement of the control valve to lowering position, check valve 76 closes and fluid exhausted from the power unit is directed through the branch passage 70.

It has been found that selected working depths can be maintained with greater accuracy and with less hunting by restrictively controlling the rate of descent of the implement. Moreover, such control insures sufficient weight transfer from the implement to the tractor to provide adaquate traction as the implement is being pulled into the ground. Control of the rate of descent or the drop rate of the hitch linkage and implement is provided in the present instance by an adjustable metering valve 77 interposed in the exhaust passage 70.

While the setting of the valve 77 determines the drop rate of the hitch linkage, the restrictor valve with which it is associated acts automatically to keep the drop rate constant when implements of different weights are mounted on the hitch linkage. Thus fluid discharge from the cylinder 21 in the lowering of the hitch passes through the metering valve 77 and the ports 68 of the restrictor valve on its way to the sump through the control valve ports 55. Valve member 73 of the resistor valve is thus subject to a pressure differential tending to move it to the left or into position to partially close the ports 68. More particularly, the right end of the valve member is subject to the full ram pressure applied through the fluid in the passage 69. The left end of the valve member, on the other hand, is subject to the pressure in the passage 70 which is reduced by the action of the metering valve. The valve member 73 accordingly assumes a position effective to partially close the ports 68 and thus maintain a uniform pressure drop through the valve. Any increase in the drop rate is reflected by a corresponding decrease in pressure in the passage 70 and valve member 73 is automatically advanced to throttle fluid flow through the ports 68 and thus restore the pressure balance.

The valve assembly 37 may also be utilized to control the fluid supply to an auxiliarly hydraulic actuator such as that shown in FIG. 2 as comprising a cylinder 78 fitted with a working piston 79. In the exemplary actuator the piston is operatively connected with an implement part or other element to be moved by a piston rod 80. Pressure fluid is supplied to and exhausted from the cylinder 78 by way of a conduit 81 suitably connected with the fluid supply conduit 72 for the power unit.

MANUAL AND AUTOMATIC CONTROL

Actuation of the valves of the assembly 37 is effected manually by the driver of the tractor and automatically under control of selectively available draft responsive and position responsive means. Both automatic controls operate in conjunction with the manual control, the draft responsive means acting to maintain the draft load to which the implement subjects the tractor at a manually predetermined constant magnitude. The draft load is the force resulting from the reaction of the ground against the implement as the latter is drawn forwardly by the tractor. Accordingly, the case of a soil working implement such as a plow, maintenance of a constant draft load results in maintaining the implement at a more or less constant working depth under substantially uniform soil conditions. The position responsive means when selected for operation acts to shift the hitch linkage to and maintain it at a manually predetermined level relative to the tractor.

CONTROL SELECTION

Manual control selection between automatic draft and position control and regulation of the selected control is effected through the medium of a single hand lever 85. The hand lever is fixed on the projecting end of a transverse rock shaft 86 journalled in the housing cover plate 13. Preferably the lever is presented at the right side of the tractor in a position in which it is conveniently accessible to the tractor driver.

Fixed on the shaft 86 within the housing 14 are a pair of eccentrics 87 and 88. Eccentric 87 rotatably supports a control lever having one arm 89 positioned for cooperation with the plunger 56 of the main control valve as shown in FIG. 4. The other arm 90 of the lever is connected with the draft responsive means as will appear presently. This lever is referred to hereinafter as the draft control lever.

Eccentric 88 rotatably supports a bell crank lever having an arm 91 positioned alongside the arm 89 for alternate cooperation with the control valve plunger 56. The other arm 92 of the bell crank lever is extended rearwardly and provided with a follower 93 (FIG. 2) positioned to cooperate with a cam 94 on the lift shaft 25. The cam is shaped to coordinate the position of the lever with the position of the hitch linkage in relation to the tractor.

Also fixed on the hand lever shaft 86 is a cam disc 95. The cam disc is positioned to engage the projecting end of the by-pass valve plunger 46 as shown in FIG. 4. A notch 96 in the edge of the cam is located to receive the valve plunger when the hand lever 85 is set in the neutral position in which it is shown in full lines in FIG. 3. With the cam so positioned, spring 47 shifts the valve plunger to open position, thus by-passing the pressure fluid from the pump back to the sump. Upon movement of the hand lever in either direction from the neutral position, cam 95 shifts the valve plunger 46 to the right to close the by-pass ports 45 and thus initiate delivery of pressure fluid through the check valve 50 to the main control valve as before explained.

For carrying out its selecting and controlling functions, the hand lever 85 is adapted to be swung through three different ranges in an arc of approximately 180° as shown in FIG. 3. Thus, the lever may be swung forwardly in the arc A—B which is the draft control range and in this arc it acts jointly with the draft responsive means to regulate the draft load on the implement and thus determine the implement working depth. Similarly the lever may be swung rearwardly in the arc C—D which is the position control range and in that arc it acts jointly with the position control means or cam 94 to regulate the position of the hitch linkage relative to the tractor. Swinging of the lever through the intermediate arc E—F is utilized to control auxiliary assemblies described in detail later on.

The selecting action of the hand lever 85 is determined by the angular relationship of the eccentrics 87 and 88 to each other and to the hand lever. As shown in FIG. 4, the eccentrics are displaced from each other approximately 120° at opposite sides of and approximately equidistant from a plane through the axis of the shaft 86 normal to the hand lever. Accordingly, movement of the control lever into the draft control range A—B will shift the pivot axis of the draft control lever 89—90 forwardly or toward the valve assembly into cooperative relation with the control valve. At the same time, the pivot axis of the position control lever 91—92 is shifted rearwardly to carry the lever to an inactive position. Movement of the hand lever rearwardly into the position control range C—D reverses the position of the control levers. More particularly, with the hand lever in the range C—D, control lever 91—92 is conditioned for operating the control valve plunger 56 and draft control lever 89—90 is shifted to inactive position.

DRAFT CONTROL

Selection of the draft control lever 89—90 for operation places the draft responsive means and hand lever 85 jointly in control of the main valve. The draft responsive means in the present instance is associated with the draft links 10 of the hitch linkage. As previously explained, the links are pivoted to the arms 15 depending from the rock shaft 16. The draft on the implement attached to the hitch linkage accordingly tends to rotate the shaft 16 clockwise as viewed in FIG. 2. Compressive forces exerted through the draft links as, for example, when the links and attached implement are raised to a transport position, tend to rock the shaft 16 in the opposite direction.

Novel means is provided for balancing the forces transmitted through the draft links, that is for yieldably resisting rotation of the shaft 16 in either direction by such forces. More particularly, a simple yet effective spring arrangement is associated with the shaft in a manner such that its displacement is proportional to the force imposed on the draft links.

Referring more particularly to FIG. 2, the balancing spring arrangement in its preferred form includes a lever 95a nonrotatably mounted on the shaft 16 and projecting radially and generally horizontally therefrom. Disposed on opposite sides of the lever are a pair of leaf springs 96a and 97a each anchored at one end to the lever adjacent the shaft 16 as by a bolt 98. The latter spring which overlies the upper face of the lever 95a has its free end in engagement with the fixed stop 99 positioned to enable it to resist clockwise rotation of the shaft 16.

Preferably, the upper face of the lever 95a is formed with a cam profile 100 effective to automatically decrease the effective length of the spring 97a as the shaft and lever are turned in a clockwise direction. Accordingly, the resistance offered by the spring to the rotation of the shaft is progressively increased as the draft load on the hitch linkage increases and tends to rock the shaft through a greater arc. This progressive increase in resistance is highly advantageous in maintaining proper sensitivity of the draft responsive means.

The lower spring 96a which, in this instance, is laminated, has its free end in engagement with a fixed stop 101 positioned to enable the spring to resist anticlockwise rotation of the shaft 16. Such rotation occurs from a compressive force exerted through the draft links 10 which may occur when an implement is carried in transport position. Compressive forces may also be experienced with heavy implements, as, for example, when the moment thereon due to the draft force is less than the moment imposed by the overhanging implement weight. Spring 96a thus permits the draft responsive means to function effectively with heavy implements. In addition, it serves as a cushion for implements when in transport position. A projection 102 adjacent the end of the lever 95a engages the spring 96a in the vicinitiy of the fixed stop 101 to define the limit position to which the hitch linkage and associated parts may be shifted in a forward or compressive movement of the draft links.

It will be evident from the above that the draft forces acting on the implement, within practical limits, are reflected by corresponding movements of the lever 95a. Such movements are transmitted from that lever to the draft control lever 89—90 by a linkage including a rod 105 and arm 106. The arm is welded or otherwise rigidly attached to the lever 95a adjacent its free end to define therewith an L-shaped lever assembly. At its upper end the arm 106 is pivotally connected to an end of the rod 105 which has its other end pivotally connected as at 107 (FIG. 4) to the arm 90 of the control lever. The latter connection includes a fitting 108 threaded on the rod and affords adjustment of the effective length of the rod.

The pivotal connection between the rod 105 and the arm 106 also constitutes a one-way lost motion connection. As shown in FIG. 2, this connection includes a stud 110 pivotally mounted at the end of the arm 106 and formed with a diametrically disposed aperture dimensioned to slidably receive the rod 105. An abutment 111 on the rod which may conveniently comprise a washer welded, pinned or otherwise secured to the rod by a stud 110 provides a positive coupling by which the movements of the arm 106 are transmitted to the rod in one direction.

Movements of the arm 106 in the opposite direction are transmitted to the rod 105 through the yieldable or lost motion connection. This connection includes a compression spring 112 interposed between an abutment or washer 113 rigidly fixed to the rod and a washer 114 slidably mounted on the rod adjacent the stud 110.

It will be evident that signals indicating an increase in draft load are transmitted to the control lever 89—90 in a positive manner through the fixed abutment 111 and the rod 105. If the draft increase signal is quicker than the valve plunger can follow the arm 89 is simply retracted from the plunger without damage to the parts involved. The plunger then follows at a rate determined by its associated damping means.

Movement of the arm 106 in the opposite direction as in the case of a draft decrease signal is transmitted to the rod 105 through the lost motion connection above described. Accordingly, if the signal is too quick or violent for the control valve to follow, the spring 112 is compressed against the washer 113 while the valve moves smoothly under the dashpot action of its associated damping means. This lost motion connection also permits rapid movement of the hand lever 85 through the draft control arc to the lowering position without damage to the mechanism.

To operate the tractor in draft control the driver simply swings the hand lever 85 forwardly from neutral position into the range A—B. In the initial movement of the hand lever, the by-pass valve plunger 46 is shifted to closed position and the draft control lever 89—90 is swung into operative position. Position control lever 91—92 is swung rearwardly to the inactive position. Assuming the hitch linkage to be in transport position, the main valve plunger 56 will be in its lefthand position closing ports 55 as the hand lever approaches the arc A—B.

If the hand lever 85 is now pushed down toward the bottom of the arc, that is, toward position B, control lever 89—90 will be rotated anticlockwise since its arm 90 is held stationary by the link 105 as the axis of the lever moves forwardly with the hand lever. Such rotation of the control lever shifts the valve plunger 56 to the right sufficiently to open the ports 55, thereby diverting the fluid supplied by the pump to the sump. Cylinder 21 of the power unit is also vented to the sump allowing the piston 22 to retreat into the cylinder and lower the draft linkage and attached implement.

As the implement enters the ground it becomes subject to resistance and the draft forces imposed on the links 10 produce a proportional rotation on the shaft 16 against the force exerted by the balancing spring 97a. Rotative movements of the shaft 16 are transmitted through the lever 95a, arm 106 and rod 105 to the control lever 89—90 rocking the lever in a clockwise direction or away from the valve plunger 56 which is accordingly shifted toward the closed position by the associated springs.

It will be appreciated that the value of the draft load required to return the valve plunger to a balanced position is dependent on the distance the hand lever has been advanced in the arc A—B. In other words, the farther the hand lever is moved from the position A, the greater the initial displacment of the valve plunger 56 toward open position and the higher the draft load required to effect return of the plunger. In any case, the closing movement of the valve plunger proceeds with a gradual throttling of fluid flow through the ports 55 until the pressure prevailing in the system is just sufficient to sustain the implement at the desired working depth determined by the setting of the hand lever.

If the draft load increases beyond the value called for by the hand lever setting, further rotation of the shaft 16 rocks the control lever in a direction to permit further movement of the valve plunger 56 to the left. The additional throttling of the exhaust fluid allows pressure to build up in the system and the power unit imparts a lifting movement to the linkage. As the implement is raised, the draft load decreases and this is reflected by a corresponding clockwise rocking of the shaft 16. Such movements imparted to the control lever 89—90 serve to reposition the valve plunger 56 to reestablish the balance between the pressure in the hydraulic system and the draft load.

Operation of the draft control mechanism proceeds in a reverse manner when the draft load on the implement decreases from the value set by the hand lever. When such a decrease occurs, the shaft 16 and control lever 89—90 act to shift the plunger 56 to the right thereby increasing the amount of fluid vented from the system and allowing the hitch linkage and implement to descend. As the implement penetrates the ground and the draft load correspondingly increases, the valve plunger is progressively shifted back until a balanced condition is attained and the implement is operating at the desired depth.

POSITION CONTROL

Swinging of the hand lever 85 rearwardly or into the arc C—D shifts the draft control lever 89—90 to inactive position and moves the position control lever 91—92 into operative relation to the valve plunger 56. The hand lever is then conditioned to act jointly with the cam 94 in raising or lowering the hitch linkage into a selected position relative to the tractor and for maintaining it in such position.

As will be seen by reference to FIG. 2 of the drawings, the cam 94 which is mounted on and rotatable with the lift shaft 25, is shaped so as to rock the lever 91—92 anticlockwise as the hitch links are raised. A spring 115 acting on the control lever maintains the follower 93 in engagement with the cam. Lowering of the hitch linkage and anticlockwise rotation of the shaft 25 permits the control lever to turn clockwise.

When the hitch linkage is in the elevated or transport position rearward swinging of the hand lever 85 into the arc C—D acts to carry the control lever forwardly and arm 91 engages the valve plunger 56 to shift it to the right to open the ports 55. This vents fluid from the cylinder 21 of the power unit and allows the linkage to descend as before described. As the lift shaft rotates, cam 94 imparts a clockwise movement to the control lever swinging the arm 91 to the left and permitting the valve plunger 56 to follow in the same direction under the urging of its springs. Such movement continues until a hydraulic balance is attained effective to hold the linkage and attached implement in a position determined by the setting of the hand lever 85 within the arc C—D. In other words, the hitch linkage follows precisely the movements of the hand lever 85 and comes to rest in a position corresponding to that occupied by the hand lever in the position control range.

TRANSPORT POSITION LOCK

The valve 38 previously referred to protects the hydraulic system against excessive overload pressures and additionally provides a convenient means for unloading the pump 30 when an implement is carried in transport position. In accordance with the invention, the unloading of the pump under such conditions is made practical by the provision of novel means for mechanically locking the hitch linkage in transport position.

Transport position of the linkage is determined in this instance by a stop-pad 116 on the housing cover plate 13 positioned for engagement by a stop surface 117 on the crank arm 24 as shown in FIG. 2. Supported for rotation in the cover plate 13 is a locking pin 118 formed with a transverse slot or groove 119 in one side. When the pin is rocked to operated or locking position, the solid portion in back of the groove is presented in the path of an abutment 120 formed on the end of the crank arm 24. The crank arm 24 and lift shaft 25 upon which it is mounted are thus positively blocked against movement in a direction to lower the hitch linkage.

To release the shaft for lowering the hitch linkage, the pin 118 is rotated until the slot occupies the position indicated in broken lines in FIG. 2. The slot then affords clearance for the abutment 120 so that the crank arm can swing down and lower the hitch linkage as previously described. A handle 121 on one end of the pin provides convenient means for manually rotating it between locking and release positions. In practice, a suitable detent or biasing spring is provided for maintaining the pin in set position.

OVERLOAD RELEASE AND PUMP UNLOADING

The mechanical blocking of the lift mechanism when the linkage is raised to transport position prevents further operation of the power unit 20 and consequently the hydraulic pressure in the system rises as the pump 30 continues to operate. This pressure rise is utilized to open the valve 38 and unload the pump in the same manner as when excessive pressure develops in the system from any other cause.

Figure 6:
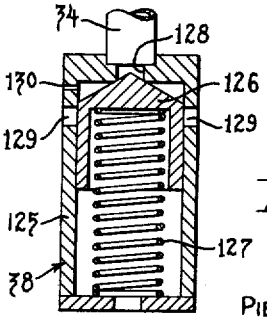
FIG. 6 is an enlarged sectional view of the unloading valve shown in FIG. 2.

As shown in FIG. 6, valve 38 comprises a casing 125 having a slidable valve plunger 126 urged by a spring 127 to close a relatively small port 128 connecting with the supply conduit 34. The valve plunger also slides over and closes a series of exhaust ports 129 in the casing. When the plunger is in the valve closing position. only a small area of its upper face is exposed to the pressure of the fluid at the port 128. The spring 127 exerts sufficient force on the plunger to maintain it in closed position under normal operating pressure. A small bleed port 130 in the upper end of the casing prevents pressure from building up in the casing in the event of slight leakage around the plunger.

When the pressure in the system rises a predetermined amount above the normal operating pressure, the resistance of the spring is overcome and the plunger 126 is forced away from the port 128. As the port is opened, the full area of the plunger is exposed to the pressure at the pump discharge and the plunger is therefore quickly shifted to the open position in which the ports 129 are either fully or partially uncovered. The fluid delivered by the pump 30 is exhausted through the ports 129 to the sump and the pressure in the system is accordingly reduced to a value such that the force exerted by the spring 127 is balanced by the pressure exerted against the full area of the valve plunger. Accordingly a minimum pressure is maintained in the system at all times, but this pressure is low enough so that the pump can continue in operation without excessive waste of power and without objectionable heating of the fluid.

The relief valve 38 may be reset to closed position by reducing the pressure in the system sufficiently to allow the spring 127 to return the plunger to closed position. Such pressure reduction can be effected quickly and conveniently by swinging the hand lever 85 to neutral position. Cam 95 is thus positioned to allow the by-pass valve plunger 46 to move into open position and the pump delivery is thus discharged to the sump at very low pressure.

CONTROL OF AUXILIARIES

Control of auxiliary actuators such as the cylinder and piston actuator 78—79 is effected by movement of the hand lever through its third operating range, that is, through the arc designated E—F in FIG. 3. The actuator shown in FIG. 2 is a one-way ram and introduction of pressure fluid into the right or closed end of the cylinder 81 acts to force the piston 79 and its load toward the left. The load is applied to the piston in a manner such that it tend to return the piston toward the closed end of the cylinder when fluid is permitted to exhaust therefrom. It will be understood that auxiliary actuators of the type illustrated may be mounted on the tractor or on an implement coupled to the tractor. It will also be understood that the tractor usually is provided with suitable fittings for quick and easy connection of such actuators.

With the hand lever 85 set in the neutral position in which it is shown in FIG. 3, the main control valve is closed and the by-pass valve is open. The latter valve accordingly diverts the pump discharge to the sump. The main power unit 20 and the auxiliary actuator are retained in the position to which they were previously operated by the check valve 50 which prevents exhaust of fluid from the respective cylinders. When the auxiliary actuator is to be operated alone, the hitch linkage may be mechanically locked in the raised or transport position as above explained.

If it is desired to operate the auxiliary actuator in a lifting direction, hand lever 85 is swung clockwise from the neutral position within the arc E—F (FIG. 3). Such movement of the hand lever operates through the cam 95 to shift the by-pass plunger 46 to closed position. movement within the range E—F, however, is not sufficient to change the condition of the main control valve plunger 56 which remains in closed position. Upon closure of the by-pass valve, fluid under pressure is directed through the valve assembly to the auxiliary cylinder 78 to force the piston 79 to the left as viewed in FIG. 2. When it has moved to the desired extent as determined by visual observation of the implement part or other element with which the piston is connected, further operation of the auxiliary actuator may be interrupted by returning the hand lever 85 to the neutral position.

To lower the load carried by the auxiliary actuator, the hand lever 85 is swung rearwardly or anticlockwise toward the end E of its auxiliary control range. Upon reference to FIG. 3, it will be observed that the control ranges represented by the arcs C—D and E—F overlap slightly. Accordingly, as the hand lever passes position C on its movement toward position E, and in the range between C and E, it advances position control lever 91—92 to the right sufficiently to push the valve plunger 56 to open position. This allows fluid to exhaust from the cylinder 78 as the piston 79 moves into the cylinder under the urging of its load. The lowering action may be allowed to continue under visual observation and may be terminated at will by returning the hand lever to neutral position.

MID-MOUNTED IMPLEMENTS

The hydraulic operating and control system of the present invention may be used for the operation and control of so-called mid-mounted implements as well as with implements carried by the usual trailing hitch linkage. To accommodate such implements, the tractor is conveniently provided with a depending frame 130 upon which one or more ground working tools such as cultivator shovels 131 may be mounted for movement between a raised or inactive position and a lowered or working position. Raising and lowering of the tools is effected by the power unit of the tractor through the same lift arm 25 utilized to raise and lower the hitch linkage. For this purpose, one or more crank arms 132 are nonrotatably fixed to the projecting ends of the shaft 25 and connected by links 133 with crank arms 134 nonrotatably mounted on a cross shaft 135 journalled on the tractor. Other crank arms 136 on the shaft 135 are operatively connected in known manner with means for supporting the tools 131 on the frame 130 or with supporting means for tools mounted elsewhere on the tractor as, for example, adjacent its front end.

To enable the mid-mounted tools to actuate the draft responsive means of the tractor and thus make use of the automatic draft control afforded by the system, the frame 130 is mounted for pivotal movement about a transverse, horizontal axis, in this instance on the shaft 135. Links 137 connect the lower end of the frame to the arms 15 upon which the draft links 10 of the hitch linkage are anchored.

In the operation of the mid-mounted implements of the type above described, ground reaction on the tools 131 is transmitted as a compressive force through the links 137 to the arms 15. The force thus applied to the arms tends to rotate the shaft 16 in the same direction in which it is rotated by tension forces produced by draft loads on the hitch links 10. Rocking movements of the shaft 16 are transmitted to the draft control lever 89—90 which cooperates with the hand lever 85 to control the power unit for maintaining the draft load on the tools 131 substantially uniform and at a value selected by the position of the hand lever in its draft control range A—B. As the raising and lowering of the tools 130 is effected by the lift shaft 25, the mid-mounted implement may also be operated under position control by simply swinging the hand lever 85 in its operating range C—D.

RÉSUMÉ OF OPERATION

It will be apparent from the foregoing that the invention provides a tractor hydraulic system and controls which makes it practical to operate a wide variety of implements efficiently and dependably with the tractor. The improved system provides a full range of controls for practically every implement commonly used with a tractor including automatic draft control and automatic position control. Additionally, it provides for visual control of auxiliaries associated with a tractor or with implements coupled thereto.

Selection between the various types of control as well as operation under the selected type of control is effected with ease and certainly by means of a single manually operable member such as the hand lever 85. In the preferred form of the system illustrated, the control lever is pivoted to swing in either direction from a central, neutral position. When swung in one direction, the system is conditioned for automatic draft control and when swung in the opposite direction, it is conditioned for the automatic position control. Within each of those control ranges implement position is effectually coordinated with the position of the hand lever.

The third control range is conveniently interposed between the position and draft control ranges. Swinging of the control lever through this third range is utilized to control the operation of an auxiliary actuator or actuators.

Implements differing greatly in weight or in other characteristics may be interchangeably coupled to the tractor without requiring modification or adjustment of the controls. This is for the reason that the system automatically adapts itself for proper control of the implement through the action of a resistor valve. Implements regardless of weight are all lowered at substantially the same rate, that is, the rate found to give the best results. Response of the controls is prompt but, at the same time, violent or too rapid shifting of the control valve either manually or automatically with the attendant excessive shock loading of the system is precluded.

Structural simplicity is enhanced by the improved arrangement for balancing the loads imposed on the hitch linkage. The balance means of the present invention has the further advantage of responding both to tension and compression loads on the hitch linkage. This materially extends the range of implement control since it provides for the actuation of implements whose overhanging weight imposes compression loads on the hitch linkage. Additionally, implements are adequately cushioned when being carried in transport position.

In general, it will be evident that the invention provides a tractor hydraulic system which is very efficient and unusually versatile. It is simple and rugged in construction. The controls for the system are simple and adapted for operation in a smooth and natural manner which greatly simplifies the work of the tractor driver.

We claim as our invention:

1. The combination in a tractor having a vertically swingable implement hitch linkage, a hydraulically operated power unit for raising and lowering the linkage and a continuously driven pump for supplying fluid under pressure to the unit, valve means controlling the delivery of pressure fluid to and exhaust of pressure fluid from the unit, other valve means operative when actuated to by-pass the pressure fluid supplied by the pump, a hand lever pivoted on the tractor adjacent said valve means to swing in opposite directions from a neutral position, means operable by said hand lever when in neutral position for actuating said other valve means, alternatively available draft load and position responsive controls for said valve means, said draft load responsive control including a member shiftable by said hand lever when swung in one direction to actuate said valve means to maintain a uniform draft load on the linkage at a value determined by the extent of displacement of the hand lever from its neutral position, and said position responsive control including a member shiftable by the hand lever when swung in the other direction to actuate said valve means for raising or lowering the linkage in positional agreement with the setting of said hand lever.

2. In a tractor, having a hitch linkage for coupling a ground working implement in trailing relation to the tractor including a pair of laterally spaced draft links, means for connecting the draft links to the tractor comprising a shaft supported on the tractor to rock about a generally transverse horizontal axis, a pair of arms rigid with and depending from opposite ends of said shaft, means pivotally connecting the ends of the draft links to the respective arms so that a draft load applied to the links tends to rock the shaft about its axis, means for yieldably resisting the rocking of the shaft including a leaf spring having one end rigidly secured to a member nonrotatably mounted on the shaft with said spring projecting radially relative to the shaft and a fixed stop mounted on the tractor at one side of said shaft and positioned for engagement by the free end of said spring.

3. In a tractor having a hitch linkage for coupling a ground working implement in trailing relation to the tractor including a pair of laterally spaced draft links, means for connecting the draft links to the tractor comprising a shaft supported on the tractor to rock about a generally transverse horizontal axis, a pair of arms rigid with and depending from opposite ends of said shaft, means pivotally connecting the ends of the draft links to the respective arms so that a draft load applied to the links tends to rock the shaft about its axis, means for yieldably resisting the rocking of the shaft comprising a lever nonrotatably fixed to said shaft and projecting radially therefrom, a leaf spring secured at one end to said lever adjacent the shaft and extending along one face of the lever, a fixed stop mounted on the tractor at one side of said shaft and engageable by the free end of the spring whereby said spring is tensioned in response to the rocking of said shaft, and a cam surface formed on said one face of said lever operative to engage and progressively decrease the effective length of said spring as said shaft is rocked about its axis.

4. In a tractor, in combination, a shaft supported for rotation about a horizontal generally transverse axis, radially projecting-arms fixed to opposite ends of said shaft, implement coupling draft links pivotally connected to the respective arms, means for resisting rotation of the shaft by tension and compression forces transmitted through said draft links comprising a lever non-rotatably fixed to the shaft and projecting radially therefrom, a pair of leaf springs each rigidly attached at one end to said lever adjacent said shaft and projecting along said lever, a fixed stop on the tractor positioned for engagement by the free end of one of said springs upon application of a force tending to rock the shaft in one direction, and a second fixed stop on the tractor positioned for engagement by the free end of the other of said springs upon application of a force tending to rock the shaft in the opposite direction.

5. In a tractor, in combination, a shaft supported for rotation about a horizontal generally transverse axis, radially projecting arms fixed to opposite ends of said shaft, implement coupling draft links pivotally connected to the respective arms, means for resisting rotation of the shaft by tension and compression forces transmitted through said draft links comprising a lever secured at one end to said shaft and projecting radially therefrom, leaf springs each secured at one end to said lever adjacent said shaft and respectively extending along opposite faces of said lever, fixed stops on the tractor cooperating with the free ends of the respective springs to resist rotation of the shaft in either direction, and a cam surface formed on one face of said lever operative to progressively reduce the effective length of the adjacent spring and thus increase the resistance opposed to rotation of the shaft as it is rocked in one direction.

6. In a tractor having a hitch linkage including a draft link, a power unit operative to raise and lower the linkage, a shaft rotatably supported on the tractor, means providing a connection between said draft link and said shaft effective to rock the shaft in opposite directions in response to tension and compression forces applied through the draft link, a first spring yieldably resisting rocking of said shaft in one direction, a second spring yieldably resisting rocking of said shaft in the other direction, and means operative to progressively increase the resistance opposed to rotation of said shaft by one of said springs as the shaft is rocked in the direction opposed by that spring.

7. In a tractor having a trailing hitch linkage and a hydraulically operated power unit for raising and lowering the linkage, valve means for controlling said power unit, a hand lever fixed to one end of a shaft pivoted on the tractor adjacent said valve means, a pair of eccentrics fixed to said shaft, a first valve actuating member rotatably mounted on one of said eccentrics, and a second valve actuating member rotatably mounted on the other of said eccentrics, the axes of said eccentrics being radially spaced from the axis of said shaft and angularly spaced with respect to each other so that either member may be moved bodily into operative relation to said valve means while the other member is moved bodily to an inactive position by rocking said hand lever and said shaft.

8. In a tractor having an implement hitch linkage and a hydraulic system including an actuator for raising and lowering the linkage, a pump supplying pressure fluid to the hydraulic system, a main control valve operative to control the supply of pressure fluid to and exhaust of fluid from the actuator, draft load responsive control means for said valve, linkage position responsive control means for said valve, a hand lever pivoted on the tractor adjacent said main valve swingable to one side of a neutral position to condition one of said control means for operating said valve and to the other side of said neutral position to condition the other control means for operating said valve, a second valve closely adjacent said main valve operable to provide a low pressure by-pass for fluid supplied by said pump, and a cam movable with said hand lever and cooperating with said second valve operative upon movement of said hand lever to neutral position to open the second valve.

9. In a tractor having an implement hitch linkage and a hydraulic system including an actuator for raising and lowering the linkage, a pump supplying pressure fluid to the hydraulic system, a main control valve operative to control the supply of pressure fluid to and exhaust of fluid from the actuator, draft load responsive control means including a valve actuating member, position responsive control means including a valve actuating member, a hand lever pivoted on the tractor, means coupling said lever to said valve actuating members effective when the lever is swung to one side of a neutral position to condition one of said actuating members for operating said valve and to the other side of said neutral position to condition the other actuating member for operating said valve, a second valve supported adjacent said main valve operable to provide a low pressure by-pass for fluid supplied by said pump, and another valve actuating member coupled to said hand lever for operating said second valve upon movement of said hand lever to neutral position, and other valve means operative to prevent exhaust of fluid from said actuator when said second valve is operated.

10. In a tractor having an implement hitch linkage and a hydraulic system including an actuator for raising and lowering the linkage, a pump supplying pressure fluid to the hydraulic system, a main control valve operative to control the supply of pressure fluid to and exhaust of fluid from the actuator, draft load responsive control means including a valve actuating member, linkage position responsive control means including a valve actuating member, a hand lever pivoted on the tractor, means coupling said lever to said valve actuating members effective when the lever is swung to one side of a neutral position to condition one of said control means for operating said valve and to the other side of said neutral position to condition the other control means for operating said valve, a relief valve operable upon a predetermined pressure rise in the system for venting the pump discharge at a relatively low pressure effective to maintain the relief valve open, a by-pass valve operable when open to by-pass the pump discharge at a substantially lower pressure effective to allow said relief valve to close, and an actuating member coupled to said hand lever operative to open said by-pass valve upon movement of the hand lever to neutral position.

11. In a tractor having a hitch linkage pivotally supported on the tractor body to swing about a horizontal axis, means for raising and lowering the linkage including a rock shaft journaled on the tractor body and operatively connected with the linkage, a crank arm fixed to said shaft and disposed within the body of the tractor, a main hydraulic actuator operable through said crank arm to rock said shaft, a pin rotatably supported on the tractor body transversely of the path described by said crank arm in the rocking of said shaft, said pin having a groove at one side affording clearance for the crank arm and a solid portion at the other side operative to block the crank ark arm against movement in a linkage lowering direction, and manually operable means for rotating said pin to selectively lock or release said shaft.

*12. In a power operating system for a tractor implement hitch linkage, the combination of a hydraulic actuator mounted on the tractor and connected to the linkage for raising and lowering the same, valve means carried by the tractor controlling the pressure fluid supply for said actuator, draft load responsive control means for said valve means, position responsive control means for said valve means, a hand lever pivotally supported on the tractor through a predetermined range on opposite sides of a*

*neutral position, and mechanism forming a part of said control means operable by said lever when swung in one direction from the neutral position for conditioning said draft load responsive control means for operating said valve means to maintain a uniform draft load on the linkage at a value determined by the position of the hand lever and for rendering said position responsive control means inactive, said mechanism being operative when the lever is swung in the other direction from the neutral position for conditioning said position responsive control means for operating said valve means to effect the raising or lowering of the linkage in positional agreement with the hand lever and for rendering said draft load responsive means inactive.*

*13. The combination in a tractor having an implement hitch linkage trailingly pivoted thereon and a hydraulically operated power unit for raising and lowering the hitch linkage, valve means carried by the tractor for controlling the operation of the unit, a hand lever pivoted on the tractor to swing in opposite directions from a neutral position, alternatively available draft load and position responsive controls for said valve means, said draft load responsive control having a member shifted by said hand lever when swung in one direction into a position to actuate said valve means to maintain a uniform draft load on*

*the linkage at a value determined by the extent of displacement of the hand lever from its neutral position, and said position responsive control having a member shiftable by the hand lever when swung in the other direction into a position to actuate said valve means for raising or lowering the linkage in positional agreement with the setting of said hand lever.*

References Cited in the file of this patent or the original patent

UNITED STATES PATENTS

| | | |
|---|---|---|
| 447,749 | Cobb | Mar. 3, 1891 |
| 488,863 | Wren | Dec. 27, 1892 |
| 2,679,199 | Strehlow | May 25, 1954 |
| 2,714,346 | Valin | Aug. 2, 1955 |
| 2,722,873 | Garmager | Nov. 8, 1955 |
| 2,722,874 | Bopf | Nov. 8, 1955 |
| 2,754,742 | Altgelt | July 17, 1956 |
| 2,786,402 | Senkowski et al. | Mar. 26, 1957 |
| 2,887,167 | Heitshu et al. | May 19, 1959 |

FOREIGN PATENTS

| | | |
|---|---|---|
| 1,070,086 | France | Feb. 17, 1954 |
| 532,614 | Italy | Aug. 29, 1955 |